United States Patent
Granville et al.

(10) Patent No.: US 11,414,982 B2
(45) Date of Patent: Aug. 16, 2022

(54) DEPTH AND DISTANCE PROFILING WITH FIBER OPTIC CABLES AND FLUID HAMMER

(71) Applicant: Halliburton Energy Services, Inc., Houston, TX (US)

(72) Inventors: John Philip Granville, Humble, TX (US); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/348,451

(22) PCT Filed: Apr. 24, 2018

(86) PCT No.: PCT/US2018/029144
§ 371 (c)(1),
(2) Date: May 8, 2019

(87) PCT Pub. No.: WO2019/209270
PCT Pub. Date: Oct. 31, 2019

(65) Prior Publication Data
US 2021/0032979 A1    Feb. 4, 2021

(51) Int. Cl.
*E21B 47/06* (2012.01)
*G01V 11/00* (2006.01)
*G08C 23/06* (2006.01)

(52) U.S. Cl.
CPC ............ *E21B 47/06* (2013.01); *G01V 11/002* (2013.01); *G01V 2210/1299* (2013.01); *G01V 2210/1429* (2013.01); *G08C 23/06* (2013.01)

(58) Field of Classification Search
CPC .............................. E21B 47/06; G01V 11/02; G01V 2210/1299; G01V 2210/1429; G08C 23/06
See application file for complete search history.

(56) References Cited

U.S. PATENT DOCUMENTS 4,597,183 A * 7/1986 Broding ................. G01B 7/026
33/701
4,722,603 A * 2/1988 Graebner ............. G01B 11/043
356/477
(Continued)

FOREIGN PATENT DOCUMENTS

WO    2014025701    2/2014

OTHER PUBLICATIONS

ISRWO International Search Report and Written Opinion for PCT/US2018/029144 dated Jan. 28, 2019.

*Primary Examiner* — John Fitzgerald
(74) *Attorney, Agent, or Firm* — John Wustenberg; C. Tumey Law Group PLLC (57) ABSTRACT

A method and system for determining a deployment profile of a fiber optic cable. The method may comprise disposing a fiber optic cable into a tubular structure, opening and closing a valve to form a pressure pulse, wherein the pressure pulse travels within the tubular structure, sensing the pressure pulse within the tubular structure with the fiber optic cable and at least one pressure transducer, recording data from the pressure pulse with the fiber optic cable and the at least one pressure transducer, and sending the data to an information handling system from the fiber optic cable. A well measurement system may comprise a tubular structure, a fiber optic cable, a valve, and an information handling system, wherein the information handling system is configured to open and close the valve to form a pressure pulse and record data from the pressure pulse.

20 Claims, 4 Drawing Sheets

(56) References Cited

U.S. PATENT DOCUMENTS

| | | | | |
|---|---|---|---|---|
| 4,852,263 A * | 8/1989 | Kerr | | G01B 7/026 |
| | | | | 33/735 |
| 5,741,978 A | 4/1998 | Gudmundsson | | |
| 6,993,963 B1 | 2/2006 | Gudmundsson | | |
| 7,458,421 B2 * | 12/2008 | Barrow | | E21B 47/04 |
| | | | | 166/66 |
| 7,946,341 B2 * | 5/2011 | Hartog | | E21B 43/26 |
| | | | | 340/854.6 |
| 8,020,616 B2 * | 9/2011 | Greenaway | | G01V 1/226 |
| | | | | 166/250.15 |
| 8,408,064 B2 * | 4/2013 | Hartog | | E21B 47/107 |
| | | | | 73/643 |
| 8,893,785 B2 * | 11/2014 | Skinner | | E21B 43/119 |
| | | | | 166/255.2 |
| 9,631,972 B2 * | 4/2017 | Hill | | G01H 9/004 |
| 9,945,215 B2 * | 4/2018 | Godfrey | | E21B 47/0224 |
| 10,031,044 B2 * | 7/2018 | Kumar | | G01M 5/0033 |
| 10,175,384 B2 * | 1/2019 | Farhadiroushan | | G01N 21/68 |
| 10,365,136 B2 * | 7/2019 | Jaaskelainen | | E21B 34/06 |
| 10,370,959 B2 * | 8/2019 | Jaaskelainen | | E21B 47/113 |
| 10,392,882 B2 * | 8/2019 | Dickenson | | E21B 21/08 |
| 2007/0131418 A1 * | 6/2007 | Barrow | | E21B 47/04 |
| | | | | 166/255.1 |
| 2008/0239872 A1 * | 10/2008 | Miller | | E21B 47/06 |
| | | | | 367/83 |
| 2009/0114386 A1 * | 5/2009 | Hartog | | G01V 8/02 |
| | | | | 166/250.01 |
| 2009/0248307 A1 * | 10/2009 | Barrow | | E21B 47/04 |
| | | | | 702/6 |
| 2009/0326826 A1 * | 12/2009 | Hull | | E21B 47/135 |
| | | | | 702/12 |
| 2012/0111104 A1 | 5/2012 | Taverner et al. | | |
| 2013/0021874 A1 | 1/2013 | Hartog et al. | | |
| 2013/0245947 A1 | 9/2013 | Samsom et al. | | |
| 2014/0262594 A1 * | 9/2014 | Lee | | G01H 13/00 |
| | | | | 181/105 |
| 2015/0054653 A1 | 2/2015 | Shinmoto et al. | | |
| 2016/0076932 A1 * | 3/2016 | Sherman | | G01H 9/004 |
| | | | | 73/655 |
| 2017/0138178 A1 * | 5/2017 | Shampine | | E21B 47/095 |
| 2018/0274355 A1 * | 9/2018 | Kona | | E21B 47/07 |
| 2020/0263537 A1 * | 8/2020 | Boone | | E21B 43/10 |
| 2020/0333487 A1 * | 10/2020 | Padhi | | G01V 1/28 |
| 2021/0215037 A1 * | 7/2021 | Stewart | | E21B 47/12 |

\* cited by examiner

DEPTH AND DISTANCE PROFILING WITH FIBER OPTIC CABLES AND FLUID HAMMER

BACKGROUND

Wellbores drilled into subterranean formations may enable recovery of desirable fluids (e.g., hydrocarbons) using any number of different techniques. During drilling operations, any number of downhole tools may be employed in subterranean operations to determine wellbore and/or formation properties. As wellbores get deeper, downhole tools may become longer and more sophisticated. Measurements taken by downhole tools may provide information that may allow an operator to determine wellbore and/or formation properties.

Fiber optic cables have been utilized as tools for measurements and may also transport data from downhole tools to the surface. As downhole operations obtain ever greater amounts of data for efficient and thorough job completion, optical fiber telemetry is being implemented in an ever-increasing number of products to provide higher data rate transmission of information and data. Fiber optic cables may be disposed in wellbores through different techniques and in different areas. For example, a fiber optic cable may be disposed in production tubing, within casing, on the outside of the casing, and/or the like. Accurately knowing deployment profile of a fiber optic cable, such as the distance and/or depth of a fiber optic cable may be important during downhole operations.

The deployment profile of a fiber optical cable as a function of distance or depth along a wellbore or tubulars structure may be beneficial during downhole operations. For example, during downhole operation, any number of tools may move within the wellbore, pierce casing, and/or stimulate the wellbore. Knowing the distance and/or depth of a fiber optic cable may allow for operators to perform downhole operations without breaking the fiber optic cable, which may lead to a loss of measurements, communication between downhole tools and the surface, and/or generally the flow of data from downhole to uphole.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to systems and methods for generating a deployment profile of a fiber optic cable as a function of depth and/or distance along a tubular structure. Tubular structures may include an oil well, gas well, completion tubing, casing, pipeline, and/or the like. It should be noted that the tubular structures may be fluid filled during operations to determine the deployment profile of a fiber optic cable as a function of depth and/or distance.

During operations, and discussed further below, a pressure pulse may be generated by opening and closing a valve in a fluid-filled annulus inside a tubular structure where a fiber optic cable may be deployed internal and/or external to the tubular structure. The pressure pulse may be recorded along the fiber optic cable and its arrival may be correlated to distance along the fiber optic cable, as well as distance along the tubular structure. In examples, the fiber optic cable may not be deployed linearly and uniformly along the tubular structure (i.e., parallel to the oil well or pipeline orientation), which may lead to differences in arrival time due to the differences in distance traveled, where the shortest distance may be the one traveled by the pressure pulse through a fluid. Additionally, the fiber optic cable may be disposed outside of the tubular structure without any slack, the arrival times of the pressure pulse as seen by the fiber optic cable may track the distance of the tubular structure trajectory. Additionally, the fiber optic cable may be disposed outside of the tubular structure with extract length in the fiber optic cable (i.e. extra slack or wrapping it around the tubular structure) which may affect the arrival times of the pressure pulse as measured by the fiber optic cable, which may not be directly proportional to the depth of the wellbore. Thus, the apparent speed of the pressure pulse as seen by the fiber optic cable may appear to vary, speeding up when there may be extra slack in the fiber optic cable.

The system and method disclosed below may be applicable to both permanent and retrievable fiber optic cable, including fiber behind casing, fiber deployed inside casing or tubing, fiber-lined coil tubing, and fiber along production pipelines (upstream, midstream, downstream). For coiled tubing that contains a fiber optic cable, this disclosure may be used to generate a depth profile for the fiber optic cable inside the coiled tubing or integrated into the coiled tubing, as well as generate a profile for the coiled tubing deployment inside an oil well production casing. By utilizing pressure pulses an operator may be able to determine fiber optic cable depth or distance as a function of depth or distance. This may be beneficial as it may be a non-invasive operation that may provide accurate deployment profile of the fiber optic cable disposed along a tubular.

Figure 1:
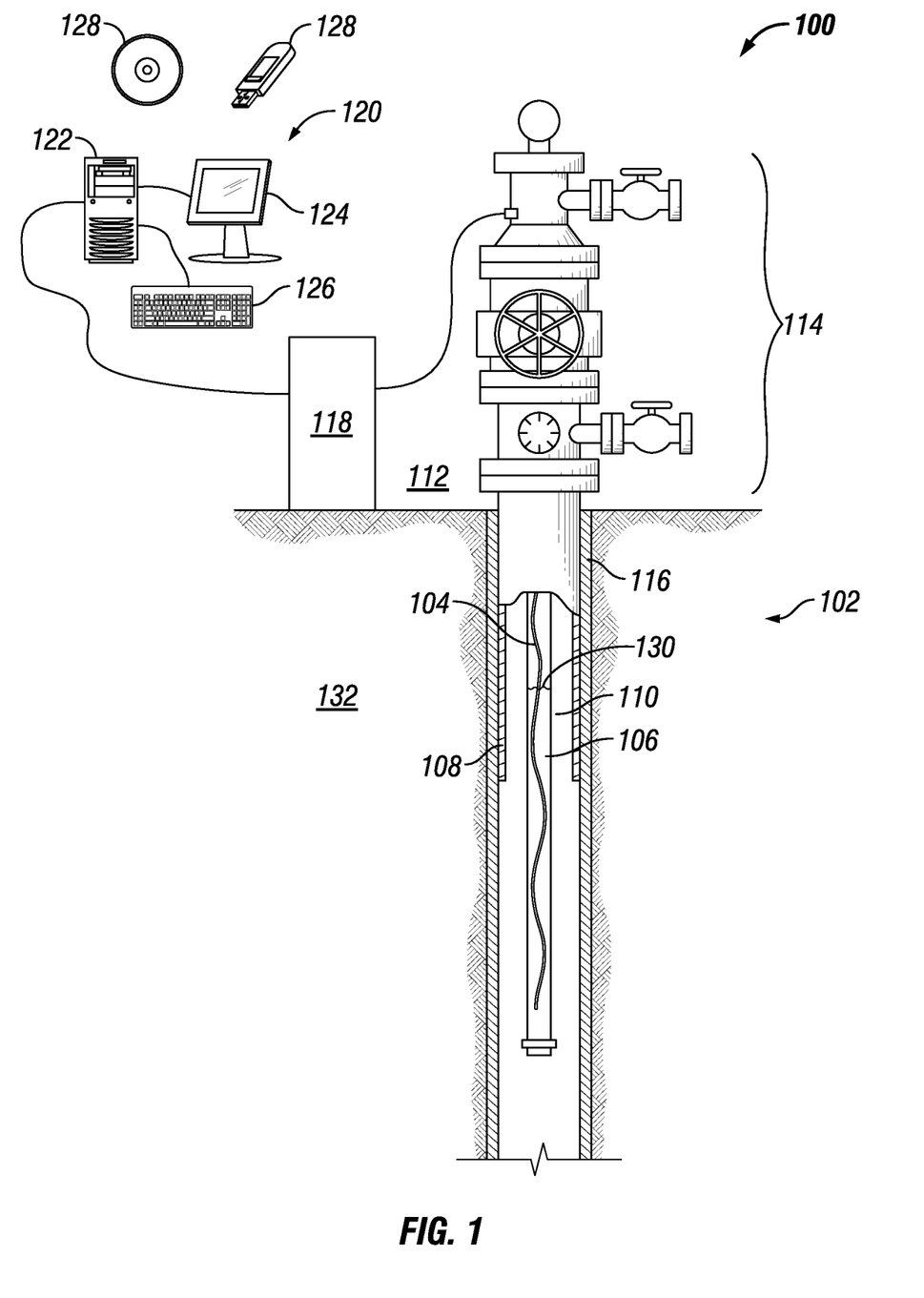
FIG. 1 illustrates an example of a well measurement system with a fiber optic cable disposed in a production tubing.

FIG. 1 generally illustrates an example of a well system 100 that may be used in a completed well 102, which may comprise a fiber optic cable 104. Fiber optic cable 104 may be disposed within production tubing 106 and further within casing 108. As illustrated, completed well 102 may comprises a series of valves 114 and other apparatuses, which may be used to cap completed well 102. In examples, casing 108 may be inserted into wellbore 116. Additionally, production tubing 106 may be inserted into casing 108. Fiber optic cable 104 may be retrievable, freestanding, or coupled within casing 108, either by attachment to production tubing 106, and/or attached to the internal portion of casing 108. Signal generator/detector 118 may be coupled to fiber optic cable 104 in order to transmit and/or receive a signal downhole. Signal generator/detector 118 may be self-contained and/or coupled to an information handling system 120.

Any suitable technique may be used for transmitting signals from fiber optic cable 104 to surface 112. Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a processing unit 122, a network storage device, or any other suitable device and may vary in size, shape, performance, functionality, and price. Information handling system 120 may include random access memory (RAM), one or more processing resources such as a central processing unit (CPU) or hardware or software control logic, ROM, and/or other types of nonvolatile memory. Additional components of the information handling system 120 may include one or more disk drives, one or more network ports for communication with external devices as well as an input device 126 (e.g., keyboard, mouse, etc.) and video display 124. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 120 may be disposed on fiber optic cable 104 or otherwise positioned on surface 112. Information handling system 120 may act as a data acquisition system and possibly a data processing system that analyzes information from fiber optic cable 104. This processing may occur at surface 112 in real-time. Alternatively, the processing may occur at another location after recovery of downhole equipment from wellbore 116 or the processing may be performed by an information handling system 120 in wellbore 116, which may be transmitted in real-time. Alternatively, the processing may occur downhole or a combination of downhole and at surface 112.

Figure 2:
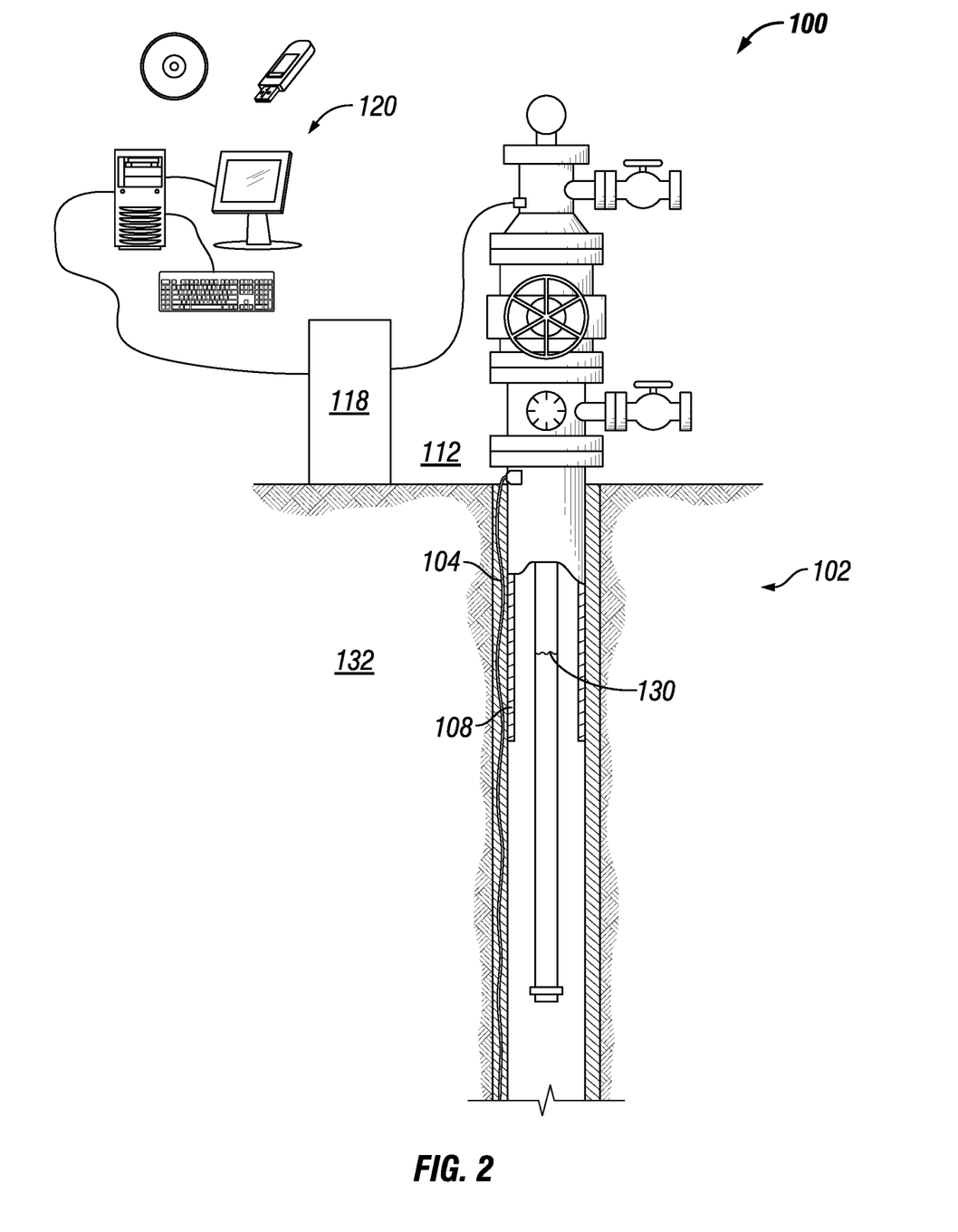
FIG. 2 illustrates an example of a well measurement system in which the fiber optic cable is cemented to a casing.

FIG. 2 generally illustrates an example of well system 100 that may be used in a completed well 102, which may comprise a fiber optic cable 104. Fiber optic cable 104 may be disposed on the outside of casing 108. For example, fiber optic cable 104 may be cemented to the outside of casing 108. Fiber optic cable 104 may attach to signal generator/detector 118 and/or information handling system 120, which may be disposed at surface 112 and/or on fiber optic cable 104.

Figure 3:
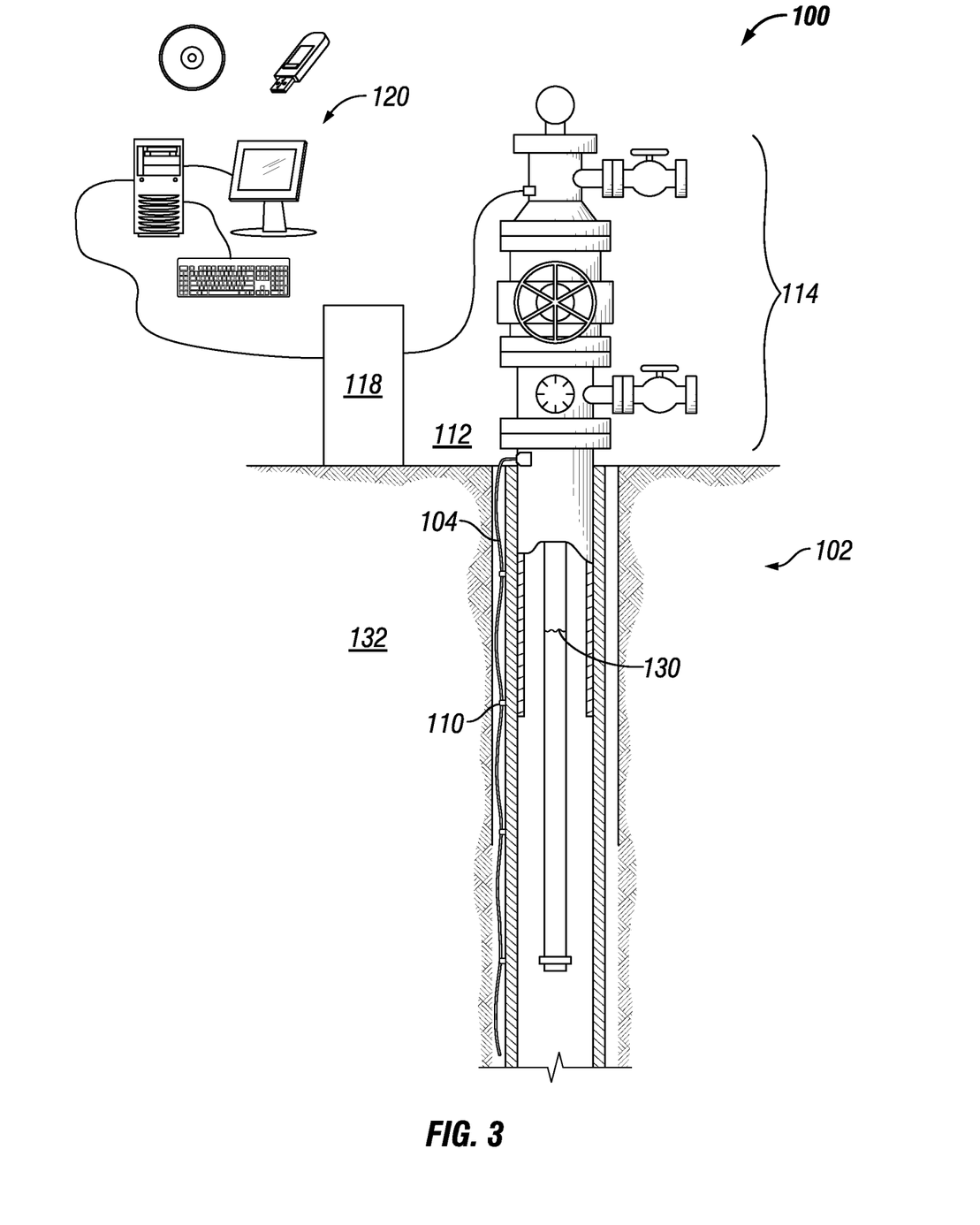
FIG. 3 illustrates an example of a well measurement system in which the fiber optic cable is clamped to the casing.

In addition examples, as illustrated in FIG. 3, well system 100 that may be used in a completed well 102, which may comprise a fiber optic cable 104. Fiber optic cable 104 may be disposed on the outside of casing 108. For example, fiber optic cable 104 fiber optic cable 104 may attach to clamps 110. Clamps 110 (or other suitable mechanical fastener) may attach fiber optic cable 104 to casing 108. Additionally, fiber optic cable 104 may attach to signal generator/detector 118 and/or information handling system 120, which may be disposed at surface 112 and/or on fiber optic cable 104.

Retrievable (temporarily deployed) fiber optic cable 104 (Referring to FIG. 1) may be deployed either via a cable or multi-cable pack that may also include conductors (for instance a Wireline cable), or deployed via coiled tubing (not illustrated). Although fiber optic data may be quite valuable for obtaining acoustic, temperature, and other information about oil wells and pipelines, it has been a challenge for the industry to develop accurate methods for correlating fiber optic data to depth or distance along production tubing 106, casing 108, tubular structures, and/or the like. Non-destructive methods based on pressure pulse technology may allow for accurate depth measurements within production tubing 106, casing 108, tubular structures, and/or the like.

Pressure pulse technology may be utilized for deposition profiling and blockage location for pipelines. For example, a pressure pulse is generated at an access point of a pipeline, during either dynamic operations (i.e., active production flow) or during static operations where the pipeline flow is shut down. The pressure pulse travels at the speed of sound forming a wave through the annular fluid in the pipe, which generates reflections back when it encounters changes to the inner diameter of the pipe. These changes to the inner diameter may result from features such as mineral deposits, residue buildup, or a change in annular fluid properties (density, viscosity, velocity). Data may be recorded via one or more pressure transducers (not illustrated) deployed inside the production pipeline or oil well tubular of interest. It should be noted that the features and/or their location may be known during operations. In addition, one or more additional transducers and/or pressure gauges may be disposed at other points along a tubular structure. Furthermore, features may also include downhole tools.

Methods and system for producing a pressure pulse 130 (Referring to FIGS. 1-3) may be a suitable method for non-destructive profiling of well system 100. Pressure pulse 130 is generated by rapidly opening and closing a valve 114, or by bleeding off a small volume, in a pressurized pipe (not illustrated). This process of rapid valve closure generates a pressure wave or pulse, also known as a fluid hammer. Pressure pulse 130 may travel at a speed which is a function of compressional speed of the fluid and properties of production tubing 106 in the fluid as described below:

$$\Delta p = \rho * c * v \qquad (1)$$

where $\Delta p$ is the differential pressure (Pascals, or Pa) generated by closing the valve (i.e., pressure wave amplitude), $\rho$ is the fluid density (kg/m3), c is velocity (m/s) with which the pressure pulse propagates in the fluid, and v is the velocity (m/s) of the fluid flow in the wellbore or tubular structure.

Producing a pressure pulse 130 may be a suitable method for non-destructive profiling of the pipeline, however it must be designed in such a way that its pressure does not exceed the allowable limits for production tubing 106. For well system 100, pressure pulse 130 may be recorded near a pressure source (e.g., valve 114 or bleed-off point), which may be disposed at surface 112. It should be noted that the pressure source may be disposed at any portion of well system 100 where valve 114 may be installed and operated, including the well head, bottom of well, or point in-between. Pressure pulse 130 may be positive or negative, and the measurement may be performed at either an inlet or outlet section of production tubing 106 (Referring to FIG. 1). The pressure pulse may be relatively low (<100 psi), but the source amplitude, frequency, and duration may be configured depending on length of production tubing 106, production and environmental noise, and relative complexity of deposition profile. The size of valve 114 may also be configurable to enable deployment in a wide variety of well systems 100 (Referring to FIGS. 1-3). A plurality of valves 114 may be used to create time delayed pressure pulses, and to generate sources from different points in well system 100 (i.e., wellhead, bottom of well, critical pipeline junctions, etc.).

Information handling system 120 may include a pulse measurement system. The pulse measurement system may include a data logger attached to one or more pressure transducers for measuring pressure changes produced by the pressure pulse over time. The pressure transducers may be disposed at valves 114 and/or at fiber optic cable 104. Information handling system 120 may determine distance along production tubing 106 from reflected pressure pulse 130 (Referring to FIGS. 1-3) inside production tubing 106 by:

$$D=0.5*c*t \quad (2)$$

where D is the distance along production tubing 106 (relative to location of valve 114), c is the pressure pulse velocity, and t is the two-way travel time (down production tubing 106 and back).

Figure 4:
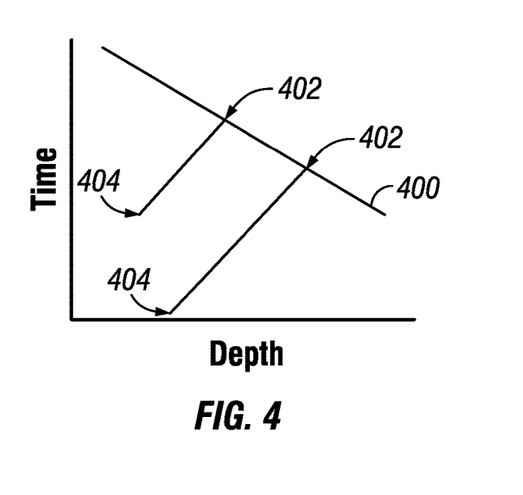
FIG. 4 is a graph of a pressure wave propagating down the production tubing as a function of time and depth.

Pressure pulse 130 (Referring to FIGS. 1-3) may propagate from valve 114, which may quickly open and close, disposed at least at one and/or a plurality of locations along production tubing 106. At any point where there is a change in production tubing 106 (or casing 108) diameter either due to buildup of wax or corrosion or a change in pipe diameter, a reflection may be created. It may also be reflected at the bottom of well system 100. These reflected pressure pulses may propagate back up production tubing 106 toward surface 112. FIG. 4 is a diagram illustrating travel path 400 of pressure pulse 130 in production tubing 106 (Referring to FIGS. 1-3). Travel path 400 of pressure pulse 130 shown propagating down production tubing 106 (from left to right in the diagram), and increases in travel time as it goes further in depth. In this example, events 402 may occur, for example, where two changes in the diameter of production tubing 106 occur. At the depth location of each of these two pipe size changes, a reflected pressure pulse 404 travels back up production tubing 106 (from right to left in the diagram), which may increases travel time.

In addition to tube diameter changes in production tubing 106, control points may be introduced in well system 100 (Referring to FIGS. 1-3), which may create reflections. For example, lowering into production tubing 106 a wireline, or lathing deployed tool with a significant cross-sectional area. The tool is lowered to specific depths in production tubing 106 and pressure puke 130 is created at one or more valves 114 (Referring to FIG. 1) and measured by one or more pressure gauges at various locations along a tubular structure, including at surface 112. Equation 2 may be used to derive the velocity of pressure pulse 130 since the depth and time of the tool is known. Because the measured depth of the tool lowered into production tubing 106 is known and the time it takes pressure pulse 130 to travel from surface 112 to the tool and then back to surface 112, the pressure pulse speed, c, may be derived by Equation 2, as a function of depth.

Equation 2 may be utilized to determine the distance away from valve 114 where each casing change occurred by measuring the travel time of each reflected event as measured at the surface pressure gauge.

Figure 5:
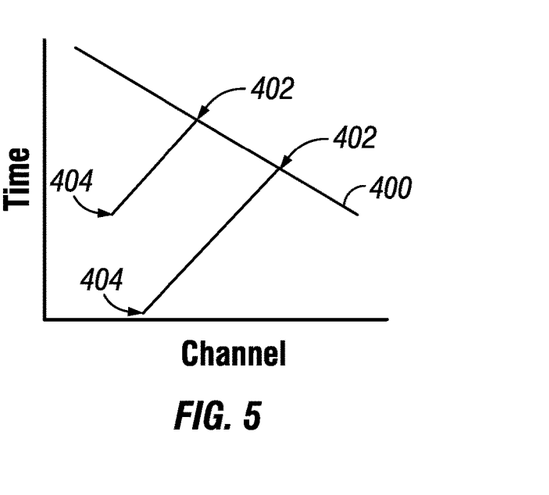
FIG. 5 is a graph of the pressure wave propagating down the production tubing as a function of time and channel.

As disclosed, fiber optic cable 104 (Referring to FIGS. 1-3) may be utilized to simultaneously record pressure pulse 130 as it travels down and up production tubing 106, while valves 114 including pressure gauges may be recording at surface 112. FIG. 5 shows the view that would be observed on information handling system 120 where pressure pulse 130 (Referring to FIGS. 1-3) may be seen on a plurality of fiber optic channels. Acquisition of fiber optic data and discretization into sensing channels is typically accomplished via Distributed Acoustic Sensing (DAS). Every measurement along fiber optic cable 104 by the DAS acquisition system creates a time series associated with a channel number, which senses strain in fiber optic cable 104 at a certain depth location. Thus, for completed well 102 that 3000 meters deep, there may be 3000 channels of DAS data created, one for each meter along may be about completed well 102. It should be noted that the mapping of the channel number to depth may only be approximately known. By analyzing recorded data collected on information handling system 120, the arrival times of the down going and up going pressure pukes 130 on each channel may be detected and recorded. Thus, the channel number where the reflection may be seen to originate on information handling system 120 may be correlated with two way travel times of the reflected pressure pulses that may be observed at valves 114 including pressure gauges at surface 112. Using Equation 2, reflected pressure pulses 404 (Referring to FIG. 4) may be converted to discrete depth locations, which may be used to determine the depth of specific channels. Interpolation may be used then to derive the depths of all channels in between those locations where reflections may be observed.

The fluid in which pressure pulse 130 (Referring to FIG. 1) is traveling may be either single phase (gas, water, or oil) or multi-phase (some combination of gas, water, and/or oil). Pressure pulses 130 may work for single-phase liquids (i.e., only oil or only water) and for multiphase liquids as well, although single-phase gas and multiphase gas+liquid may comprise weaker fluid hammer amplitudes than single-phase liquids.

Accurate acoustic velocity of pressure pulse 130 may determine accurate distance calculation in Equation 2. The acoustic velocity of the fluid in production tubing 106 (Referring to FIGS. 1-3) may be obtained by a variety of means, including, but not limited to in situ sampling via an ultrasonic or acoustic fluid velocity sensor, computation based on well completion (mud weight, depth, tubulars), or inversion for the fluid acoustic velocity from acoustic (sonic) waves such as Stoneley waves observed on sonic logs.

It should be noted that the velocity, c, given in Equations 1 & 2 may not simply be the velocity of sound of the fluid itself. It may be the velocity of pressure pulse 130 in production tubing 106 (Referring to FIG. 1). This velocity is determined from both the sound velocity of the fluid and the properties of production tubing 106, which may be found by utilizing equations for free hanging pipes in air and for rigid wall pipes, for example:

$$c=c_0(1+C(D_i/t_r)(K/E))^{-0.5} \quad (3)$$

$$c_0=\sqrt{K/\rho} \quad (4)$$

Where K is the elasticity of the fluid (or bulk modulus), $\rho$ is the fluid density in kg/cubic meters, $D_i$ is the internal diameter of the pipe in mm, $t_r$ is the thickness of the pipe wall in mm, E is Young's modulus in the pipe material in Pa, and K is the bulk modulus of the fluid in Pa. The factor C is the restraint factor use to compensate for the pipeline's anchoring, which is dimensionless and normally between 0.9 and 1. If the tubular structure is in a trench, covered with a solid material such as soil or rock, for example, the propagation velocity will increase and C is closer to unity.

However, production tubing 106 may be cemented to formation 132 (Referring to FIGS. 1-3), or it may not be cemented to formation 132. It may be that coiled tubing (not illustrated) may be in an open hole or a cased borehole, which makes the situation more complex than Equations 3 and 4 may address.

Equation 2 above describes a procedure for using the series of back reflected pressure pulses 404 for depth when the pressure pulse velocity is known. However, the velocity and density of the fluid in the borehole may be only approximately known from measurements at specific points (for example near surface 112) of production tubing 106 (Referring to FIGS. 1-3). Yet the fluid properties may change as a function of depth and thus a single value of the properties of the fluid may not be accurate enough for determining depth.

As fiber optic cable 104 may be deployed in well system 100, the down going propagating pressure pulse 130 may be recorded and captured in the seismic signals derived from fiber optic cable 104 measurements made while pressure pulse 130 may be propagating in production tubing 106 (Referring to FIGS. 1-3). The amplitude of pressure pulse 130 in recorded data, stored on information handling system 120, may be proportional to the amplitude of pressure pulse 130. However, it may require a scaling factor be applied in order for the amplitudes to match the pressure values. This may be accomplished by scaling the extracted amplitudes to match the pressure measured at the wellhead (i.e. valves 114) on the pressure gauges.

From Equation 1, it is seen that the pressure change $\Delta p$ will be proportional to the velocity of the fluid itself, v, through the multiplicative factor. Thus, utilizing multiple fiber optic cable 104 measurements, each time varying the fluid flow speed, the combined value from a simple regression of the amplitude of fiber optic cable 104 signal as a function of the produced or injected fluid flow speed may be derived.

For example, when well system 100 is being produced (or injected with fluid), this results in a fluid flow in production tubing 106 (Referring to FIGS. 1-3) of a certain velocity, v. Pressure pulse 130 may be created in production tubing 106 (as described above by quickly opening and then closing valve 114) while fiber optic cable 104 measurements may be recorded (Referring to FIGS. 1-3). The flow rate of the fluid, v, may then change slightly, pressure pulse 130 may be created again using the exact same method, and the resulting pressure wave is recorded again by information handling system 120. Any number of repetitions may be made, each time varying the flow rate of the fluid, while the recorded data from fiber optic cable 104 is being measured.

The recordings from fiber optic cable 103, one for each fluid flow rate change, may be used to extract two properties of pressure pulse 130 propagating in production tubing 106 (Referring to FIGS. 1-3), for example, the amplitude and arrival time. The arrival time may be manually or automatically tracked. The RMS or peak amplitude of the wave may then be computed within information handling system 120. This is done at each level (channel) in the borehole, typically every meter. The arrival times and amplitudes may be locally (over a few neighboring channels) combined to increase their accuracy using some multichannel signal processing techniques like averaging or filtering.

Figure 6:
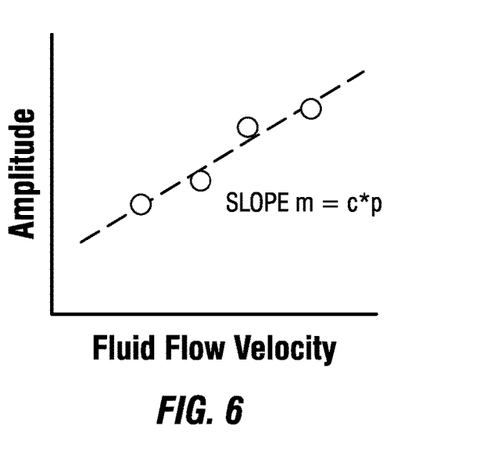
FIG. 6 is a graph of the pressure wave as a function of amplitude and fluid flow velocity.
Figure 7:
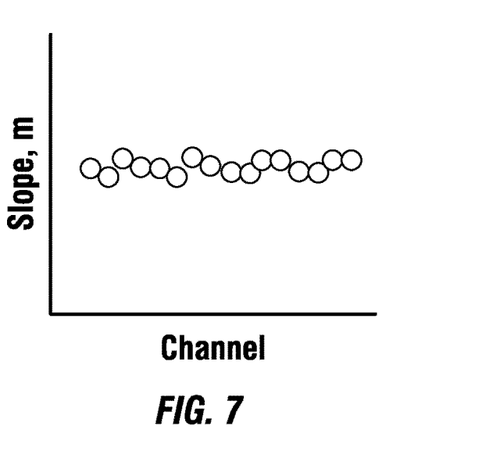
FIG. 7 is a graph of recorded data from a plurality of channels as a function of a slope and the channel.

For each channel (depth level i) the amplitude of the hammer wave for each flow rate may be cross plotted against the flow rate and a linear regression is performed to extract the slope value, m, of $m=\rho*c$, as shown in FIG. 6. This provides a profile of the slope term, m, as a function of channel, as shown in FIG. 7.

If the density of the fluid is known very accurately, then the pressure pulse velocity as a function of depth level, i, is easily computed from:

$$m(i)=c(i)*\rho \qquad (5)$$

Then the depth of each channel may be computed from $$z(i)=t(i)*\hat{c}(i) \qquad (6)$$

Where $\hat{c}(i)$ is the average pressure pulse velocity from surface 112 (channel 1) to the desired channel, i. This average is computed most accurately using the harmonic average of the individual fluid hammer velocity estimates for each channel, instead of the simple mean.

Instead of using the average pressure pulse velocity, an alternate formulation may use the summation of each depth interval traversed for each channel.

$$z(n) = \sum_{i=2}^{n} c(i)*(t(i)-t(i-1)) \qquad (7)$$

Where z(n) is the depth of channel n, and t(i) is the arrival time of the down going pressure pulse at channel i.

If the density is unknown, then it may be approximated by using control points. These control points, for example, may be the well head at surface 112 and the end of fiber optic cable 104 (Referring to FIGS. 1-3), others may be the known locations of the pipe size changes. If the channels and depths of these points (and perhaps others) are known, then an average interval density may be computed between control points from:

$$\rho_{int} = \frac{\sum_{i=j+1}^{n} m(i)*(t(i)-t(i-1))}{\Delta Z} \qquad (8)$$

Where $\rho_{int}$ in the estimate of the density over an interval from channels j tea n, $\Delta Z$ is the known distance between channels i and n, and m(i) is the fluid hammer slope values for each channel as described above. The density computed from Equation 8, may also compensate for any amplitude scaling issue that may exist in the units conversion from pressure to amplitude computations. If such issues occur, then the estimated density may be unreasonable from a physical point of view, but useful in the computation of interval pressure pulse velocities.

Figure 8:
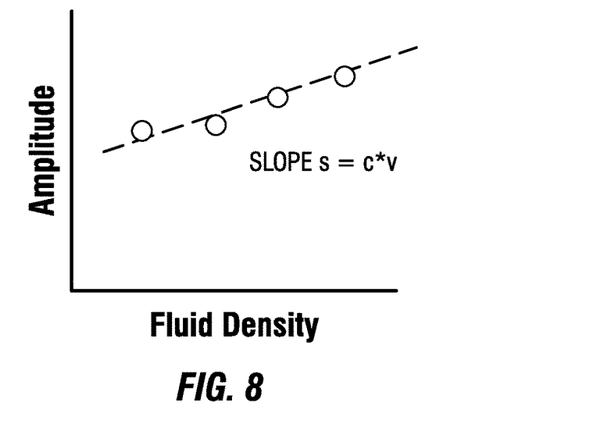
FIG. 8 is a graph of the slope for recorded data as a function of amplitude and fluid density.

Another approach is possible to more accurately determine the pressure pulse velocity. When appropriate, the fluid density properties may be changed. For example the fluid in production tubing 106 (Referring to FIGS. 1-3) may be changed out with a lighter or heavier fluid, thus effecting a density change. Another possibility is to make measurements before and during when proppant is being injected into well system 100 (Referring to FIGS. 1-3). This process may allow for the collection of more data under different conditions. As before, collecting data for several different cases when the density of the fluid has been changed and for each channel collect the arrival time and amplitude of the down going pressure pulse 130. FIG. 8 illustrates the cross plot of this data for a single channel.

Since the value of the fluid density and fluid flow velocity are known, the value of the pressure pulse velocity may be directly computed for each channel using $$s(i) = c(i)*v \qquad (9)$$

Where s(i) is the derived slope from cross plotting the amplitudes and the change in density. This allows c(i) to be computed simply from $$c(i) = \frac{s(i)}{v} \qquad (10)$$

Then equations 6 or 7 may be used to compute the depth for each channel.

As disclosed above, the amplitudes may require scaling in order for them to match the pressure value in well system 100 (Referring to FIGS. 1-3). The simplest approach is to measure the pressure at the well head and then scale the extracted amplitudes to match this pressure value at the well head. However, if this cannot be done for any reason, another approach may be used.

Equation 1 provides a simple relationship between the change in pressure with the pressure pulse velocity, density and fluid flow velocity. What is unknown is a method to convert the amplitudes measured by fiber optic cables 104 (Referring to FIG. 1-3) into pressure in the borehole. This may involve coupling and amplitude gain factors. Thus, Equation 1 may be converted to $$\frac{A}{\beta} = \Delta p = \rho * c * v \qquad (11)$$

Where A is the amplitude computed from the recorded waveforms, and β is a scale factor that converts the amplitudes to pressure changes. With this change the equation becomes:

$$A = \beta * \rho * c * v \qquad (12)$$

Then from Equations 4 and 12, the slope created from cross plotting the measured amplitudes against fluid velocity changes to:

$$m(i) = c(i)*\rho*\beta \qquad (13)$$

Again from Equations 9 and 12, the slope created from cross plotting the measured amplitudes against fluid velocity changes to:

$$s(i) = c(i)*v*\beta \qquad (14)$$

By dividing Equations 13 and 14 the following equation is derived:

$$\frac{m(i)}{s(i)} = \rho(i)/v \qquad (15)$$

Since the fluid flow velocity, v, is known, the density may be estimated, where the density may be changing as a function of channel. For simple constant fluid flow and uniform density, the ratio of m(i) to s(i) should be a constant.

Now that density has been derived, the scaling factor β can be determined from a set of control depth points by:

$$\beta = \frac{\sum_{i=j+1}^{n} \frac{m(i)}{\rho(i)} * (t(i) - t(i-1))}{\Delta Z} \qquad (16)$$

The scaling factor β is a constant so that the final accurate depth may be computed for each channel as:

$$z(n) = \sum_{i=2}^{n} \frac{m(i)}{\rho(i)*\beta} * (t(i) - t(i-1)) \qquad (17)$$

This method and system may include any of the various features of the compositions, methods, and system disclosed herein, including one or more of the following statements.

Statement 1: A method for determining a deployment profile of a fiber optic cable may comprise disposing a fiber optic cable into a tubular structure; opening and closing a valve to form a pressure pulse, wherein the pressure pulse travels within the tubular structure; sensing the pressure pulse within the tubular structure with the fiber optic cable and at least one pressure transducer; recording data from the pressure pulse with the fiber optic cable and the at least one pressure transducer; and sending the data to an information handling system from the fiber optic cable for determining the deployment profile of the fiber optic cable.

Statement 2: The method of statement 1, wherein the fiber optic cable is disposed internally or externally adjacent to the tubular structure, either freestanding, temporarily attached, or permanently mounted.

Statement 3: The method of any previous statement, wherein the fiber optic cable is integrated into the tubular structure, wherein the tubular structure is coiled tubing.

Statement 4: The method of any previous statement, wherein the fiber optic cable is cemented behind a casing disposed in a wellbore or a pipeline.

Statement 5: The method of any previous statement, wherein the fiber optic cable is attached to a casing disposed in a wellbore or a pipeline with at least one mechanical fastener.

Statement 6: The method of any previous statement, wherein the recording the data is performed on a plurality of channels by the information handling system.

Statement 7: The method of any previous statement, wherein the at least on pressure transducer or a pressure gauge is disposed on or near the valve.

Statement 8: A method for determining a deployment profile of a fiber optic cable may comprise disposing the fiber optic cable into a tubular structure, opening and closing a valve to form a pressure pulse, wherein the pressure puke travels through the tubular structure, reflecting the pressure pulse off at least one feature to form a reflected pressure pulse, sensing the reflected pressure pulse, recording data on time elapsed from opening and closing the valve until sensing the reflected pressure pulse, sending the data to an information handling system, and computing the data to determine the deployment profile of the fiber optic cable.

Statement 9: The method of statement 8, wherein the recording the data is performed on a plurality of channels by the information handling system.

Statement 10: The method of statement 8 or statement 9, wherein sensing the pressure pulse is performed with a pressure transducer, wherein the pressure transducer is disposed at the valve.

Statement 11: The method of statement 8-statement 10, wherein sensing the pressure pulse is performed with a pressure gauge, wherein the pressure gauge is disposed at the valve.

Statement 12: A well measurement system may comprise a tubular structure, a fiber optic cable, a valve, and an information handling system, wherein the information handling system is configured to open and close the valve to form a pressure pulse and record data from the pressure pulse to determine the deployment profile of the fiber optic cable.

Statement 13: The well measurement system of statement 12, wherein the fiber optic cable is disposed internally or externally to the tubular structure.

Statement 14: The well measurement system of statement 13 or statement 13, further comprises a pressure gauge and/or a pressure transducer.

Statement 15: The well measurement system of statement 13-statement 14, further comprising a signal generator/detector that is attached to the fiber optic cable and the information handling system.

Statement 16: The well measurement system of statement 12-statement 15, wherein the fiber optic cable is cemented in a casing.

Statement 17: The well measurement system of statement 12-statement 16, further comprise a pressure gauge and/or a pressure transducer.

Statement 18: The well measurement system of statement 12-statement 16, further comprising a signal generator/detector that is attached to the fiber optic cable and the information handling system.

Statement 19: The well measurement system of statement 12-statement 18, wherein the fiber optic cable is integrated into the tubular structure.

Statement 20: The well measurement system of statement 12-statement 19, further comprising a pressure gauge and/or a pressure transducer.

Statement 21: The well measurement system of statement 12-statement 20, wherein the fiber optic cable is attached to a casing through a mechanical fastener.

Statement 22: The well measurement system of statement 12-statement 21, further comprising a pressure gauge and/or a pressure transducer.

Statement 23: The well measurement system of statement 12-statement 22, further comprising a signal generator/detector that is attached to the fiber optic cable and the information handling system.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A well measurement system comprising:
a production tubing;
a valve for forming a pressure pulse;
a fiber optic cable for measuring the pressure pulse; and
an information handling system, wherein the information handling system is configured to open and close the valve to form the pressure pulse and record data from the pressure pulse measured by the fiber optic cable to determine the deployment profile of the fiber optic cable.

2. The well measurement system of claim 1, wherein the fiber optic cable is disposed externally to the production tubing.

3. The method of claim 2, wherein the fiber optic cable is disposed externally to a production tubing in a freestanding, a temporarily attached, or a permanently mounted configuration.

4. The well measurement system of claim 2, further comprising a pressure gauge and/or a pressure transducer.

5. The well measurement system of claim 4, further comprising a signal generator/detector that is attached to the fiber optic cable and the information handling system.

6. The well measurement system of claim 1, wherein the fiber optic cable is disposed internally in the production tubing.

7. The method of claim 6, wherein the fiber optic cable is disposed internally within a production tubing in a either freestanding; or temporarily deployed configuration.

8. The well measurement system of claim 6, further comprises a pressure gauge and/or a pressure transducer.

9. The well measurement system of claim 8, further comprising a signal generator/detector that is attached to the fiber optic cable and the information handling system.

10. A method comprising:
opening and closing a valve with an information handling system to form a pressure pulse, wherein the pressure pulse travels within a production tubing;
measuring the pressure pulse with a fiber optic cable; and
recording data from the pressure pulse measured by the fiber optic cable to determine a deployment profile of the fiber optic cable with the information handling system.

11. The method of claim 10, wherein the fiber optic cable is disposed externally to a production tubing.

12. The method of claim 11, wherein at least one pressure transducer or a pressure gauge is disposed on the valve or along the production tubing.

13. The method of claim 12, wherein a signal generator/detector is attached to the fiber optic cable and the information handling system.

14. The method of claim 13, wherein the recording the data is performed on a plurality of channels by the information handling system.

15. The method of claim 14, wherein the fiber optic cable is disposed externally to a production tubing in a freestanding, a temporarily attached, or a permanently mounted configuration.

16. The method of claim 10, wherein the fiber optic cable is disposed internally within a production tubing.

17. The method of claim 16, wherein at least one pressure transducer or a pressure gauge is disposed on the valve or along the production tubing.

18. The method of claim 17, wherein a signal generator/detector is attached to the fiber optic cable and the information handling system.

19. The method of claim 18, wherein the recording the data is performed on a plurality of channels by the information handling system.

20. The method of claim 19, wherein the fiber optic cable is disposed internally within a production tubing in a either freestanding; or temporarily deployed configuration.

* * * * *